United States Patent
Affatato et al.

(10) Patent No.: US 9,801,488 B2
(45) Date of Patent: Oct. 31, 2017

(54) STEAMER CONTAINER SYSTEM

(71) Applicant: CNA International Inc., Wood Dale, IL (US)

(72) Inventors: Kristin Marie Affatato, Elmhurst, IL (US); Steve Cho, Chicago, IL (US); Hyunchul Kim, Chicago, IL (US); Patrick Scott Nally, Seattle, WA (US)

(73) Assignee: CNA International Inc., Wood Dale, IL (US)

( * ) Notice: Subject to any disclaimer, the term of this patent is extended or adjusted under 35 U.S.C. 154(b) by 0 days.

(21) Appl. No.: 15/061,539

(22) Filed: Mar. 4, 2016

(65) Prior Publication Data

US 2016/0255984 A1 Sep. 8, 2016

Related U.S. Application Data

(60) Provisional application No. 62/129,390, filed on Mar. 6, 2015.

(51) Int. Cl.
*A47J 27/04* (2006.01)

(52) U.S. Cl.
CPC .......... *A47J 27/04* (2013.01); *A47J 2027/043* (2013.01)

(58) Field of Classification Search
CPC . A47J 27/04; B65D 81/3438; B65D 21/0233; H05B 6/6408
USPC ............ 220/373, 367.1, 573.5, 573.4, 573.1, 220/23.87, 23.83, 361, 377; 99/415, 411, 99/410
See application file for complete search history.

(56) References Cited

U.S. PATENT DOCUMENTS

| | | | |
|---|---|---|---|
| D199,320 S | 10/1964 | Swett | |
| 3,170,875 A | 2/1965 | Swett | |
| 3,384,263 A * | 5/1968 | Bernstein | B65D 1/22 206/519 |
| 3,485,163 A | 12/1969 | Arita | |
| D272,595 S | 2/1984 | Chase | |
| 4,574,776 A | 3/1986 | Hidle | |
| 4,626,352 A | 12/1986 | Massey et al. | |
| 5,065,889 A * | 11/1991 | Conti | A47G 19/027 220/360 |
| D326,797 S | 6/1992 | Pomroy | |

(Continued)

FOREIGN PATENT DOCUMENTS

CN 2464213 12/2001

OTHER PUBLICATIONS

International Search Report for related International Patent Application No. PCT/US2016/020968, dated May 2, 2016.

(Continued)

*Primary Examiner* — Robert J Hicks
(74) *Attorney, Agent, or Firm* — McDermott Will & Emery LLP

(57) ABSTRACT

A steamer container system is provided having a container body, a lid assembly and a steamer basket. The lid assembly is removably connected to the container body to close the opening to the cavity of the container body. The lid assembly includes a vent aperture and a vent tab having a protrusion extending therefrom that is adapted to engage and selectively close the vent aperture. The lid assembly may also have a viewing window to view the food being cooked in the container. The steamer basket is sized to fit within the cavity of the container body for cooking food thereon.

17 Claims, 12 Drawing Sheets

(56) References Cited

U.S. PATENT DOCUMENTS

| | | | |
|---|---|---|---|
| 5,195,424 A | 3/1993 | Guajaca | |
| D339,958 S | 10/1993 | Olsen | |
| 5,363,978 A | 11/1994 | Molo | |
| D353,080 S | 12/1994 | Cantereels | |
| D360,105 S | 7/1995 | Doxey | |
| D373,704 S | 9/1996 | Doxey | |
| D378,565 S | 3/1997 | Cousins | |
| D378,566 S | 3/1997 | Cousins | |
| D381,268 S | 7/1997 | Rush | |
| D390,757 S | 2/1998 | Wold | |
| 5,750,967 A | 5/1998 | Sprauer, Jr. | |
| 5,816,139 A * | 10/1998 | Scorta Paci | A47J 27/04 126/369 |
| D409,053 S | 5/1999 | Wong | |
| 5,931,333 A | 8/1999 | Woodnorth et al. | |
| D415,652 S | 10/1999 | Loew | |
| D416,754 S | 11/1999 | Laib | |
| D417,817 S | 12/1999 | Loew | |
| D419,829 S | 2/2000 | Wilson | |
| D422,176 S | 4/2000 | Laib | |
| 6,053,474 A * | 4/2000 | Stucke, Jr. | B65D 51/1683 219/735 |
| D433,884 S | 11/2000 | Fujimoto | |
| D445,687 S | 7/2001 | Gilbertson | |
| D463,719 S | 10/2002 | Epstein | |
| D466,364 S | 12/2002 | Demore | |
| D469,667 S | 2/2003 | Burton | |
| 6,578,726 B1 * | 6/2003 | Schaefer | B65D 47/265 215/387 |
| D476,861 S | 7/2003 | Zettle | |
| D490,278 S | 5/2004 | Welsh | |
| D502,847 S | 3/2005 | Leonori | |
| D505,839 S | 6/2005 | Stanos | |
| 6,952,000 B2 | 10/2005 | Ohyama | |
| D523,296 S | 6/2006 | Kim | |
| 7,131,550 B2 | 11/2006 | Vilalta et al. | |
| D536,571 S | 2/2007 | Kim | |
| D537,300 S | 2/2007 | Kim | |
| D543,077 S | 5/2007 | Kim | |
| D544,762 S | 6/2007 | Zimmerman | |
| D558,536 S | 1/2008 | Curtin | |
| D558,537 S | 1/2008 | Curtin | |
| D566,483 S | 4/2008 | Tucker | |
| D568,693 S | 5/2008 | Furlong | |
| D575,114 S | 8/2008 | Moghavem | |
| D575,115 S | 8/2008 | Zimmerman | |
| D584,111 S | 1/2009 | Eide | |
| D585,699 S | 2/2009 | Furlong | |
| D606,813 S | 12/2009 | Kim | |
| D611,807 S | 3/2010 | Miga, Jr. | |
| D612,196 S | 3/2010 | Furlong | |
| 7,678,271 B2 | 3/2010 | Curtin | |
| D613,111 S | 4/2010 | Furlong | |
| D615,349 S | 5/2010 | Furlong | |
| 7,726,483 B2 | 6/2010 | Ramanujam | |
| D621,667 S | 8/2010 | Ablo | |
| D633,757 S | 3/2011 | Smyers | |
| D656,800 S | 4/2012 | Lee | |
| D660,092 S | 5/2012 | Kyung | |
| D671,802 S | 12/2012 | Lee | |
| D671,803 S | 12/2012 | Myoung | |
| D673,807 S | 1/2013 | Grider | |
| D676,276 S | 2/2013 | Muspratt-Williams | |
| D677,159 S | 3/2013 | Sina | |
| 8,592,736 B2 | 11/2013 | DiLonardo et al. | |
| D698,199 S | 1/2014 | Yessin | |
| D705,593 S | 5/2014 | Stamper | |
| 8,729,438 B2 | 5/2014 | Iwasaki | |
| D708,470 S | 7/2014 | Heiberg | |
| 8,850,964 B2 | 10/2014 | Pawlick et al. | |
| 8,866,056 B2 | 10/2014 | Shapiro et al. | |
| D718,579 S | 12/2014 | Lee | |
| D718,580 S | 12/2014 | Lee | |
| D721,246 S | 1/2015 | Thurin | |
| D723,339 S | 3/2015 | Maxwell | |
| D730,127 S | 5/2015 | Maxwell | |
| D731,261 S | 6/2015 | Hauser | |
| D734,103 S | 7/2015 | Kin | |
| D735,524 S | 8/2015 | Holding | |
| D742,224 S | 11/2015 | Thurin | |
| D751,335 S | 3/2016 | Shirley | |
| D754,494 S | 4/2016 | Schuler | |
| 9,340,334 B2 | 5/2016 | DeSiena | |
| D759,420 S | 6/2016 | Lee | |
| 2002/0060216 A1 | 5/2002 | Chan | |
| 2003/0116572 A1 | 6/2003 | Klock et al. | |
| 2003/0217649 A1 | 11/2003 | Leonori | |
| 2004/0040961 A1 | 3/2004 | Vilalta et al. | |
| 2004/0232026 A1 | 11/2004 | Goeking et al. | |
| 2009/0014443 A1 | 1/2009 | Skaife | |
| 2009/0026205 A1 | 1/2009 | Moon | |
| 2009/0107993 A1 | 4/2009 | Ohyama | |
| 2009/0200296 A1 | 8/2009 | Wasaki | |
| 2011/0114638 A1 | 5/2011 | Kettner | |
| 2013/0284727 A1 | 10/2013 | Tai | |
| 2014/0042167 A1 | 2/2014 | Lindsay et al. | |
| 2014/0138376 A1 | 5/2014 | Cheung | |
| 2014/0224799 A1 | 8/2014 | Iwasaki | |
| 2014/0224823 A1 | 8/2014 | Iwasaki | |

OTHER PUBLICATIONS

Pyrex No-Leak System, http://www.pyrexware.com/pyrex-no-leak, at least as early as Jul. 1, 2014.
Anchor True-Seal System, http://anchorhocking.com/prod_208_trueseal.html, at least as early as Jul. 1, 2014.
NordicWare Essentials Microwave Cook Set, https://www.amazon.com/Nordic-Ware-Microwave-6-Piece-Essentials/dp/B00008UA3K, at least as early as Jul. 1, 2014.
MicroBuddy (As Seen on TV), https://www.seenontv.com/product/microbuddy, at least as early as Jul. 1, 2014.
Tupperware Heat n' Serve, https://www.amazon.com/Tupperware-Heat-Serve-Containers-Bowls/dp/B004USS8SY, at least as early as Jul. 1, 2014.
Ziploc VersaGlass Containers, http://www.walmart.com/ip/Ziploc-6pc-VersaGlass-Container-Variety-Pack/15819201, at least as early as Jul. 1, 2014.
Tupperware Clear Bowl, https://www.amazon.com/TP-840-T177-Tupperware-Clear-Bowl-Slimline/dp/B00NV1QH3 . . . , at least as early as Jul. 1, 2014.
Martha Stewart Collection, http://www1.macys.com/shop/product/martha-stewart-collection-12-piece-glass-food-storage . . . , at least as early as Jul. 1, 2014.
Snapware Tempered Glasslock Storage Containers, https://www.amazon.com/Snapware-Tempered-Glasslock-Containers-Microwave/dp/B008T . . . , at least as early as Jul. 1, 2014.
Rubbermaid Glass Containers, http://www.target.com/p/rubbermaid-10-pc-glass-food-storage-set/-/A-14051268?ref=tgt_ad . . . , at least as early as Jul. 1, 2014.
NordicWare Microwave Steamer, https://www.nordicware.com/store/product_detail/vegetable-seafood-steamer, at least as early as Jul. 1, 2014.
Progressive MiracleWare Fish and Vegetable Steamer, http://progressiveintl.com/products/microwave-fish-and-veggie-steamer, at least as early as Jul. 1, 2014.
Sistema Oatmeal Maker, http://sistemaplastics.com/products/microwave/Breakfast-Bowl, at least as early as Jul. 1, 2014.
Sistema Steamer, http://sistemaplastics.com/products/microwave/large-microwave-steamer, at least as early as Jul. 1, 2014.
NordicWare Microwave Bacon Rack, http://www.walmart.com/ip/Nordic-Ware-Reversible-Microwave-Bacon-Rack/14913043?w . . . , at least as early as Jul. 1, 2014.
NordicWare Popcorn Popper, https://www.nordicware.com/store/product_detail/microwave-popcorn-popper, at least as early as Jul. 1, 2014.
Progressive Microwave Grill, http://progressiveintl.com/products/large-microwave-grill, at least as early as Jul. 1, 2014.

(56) References Cited

OTHER PUBLICATIONS

International Search Report for related International Application No. PCT/US2016/020968, dated May 2, 2016.

* cited by examiner

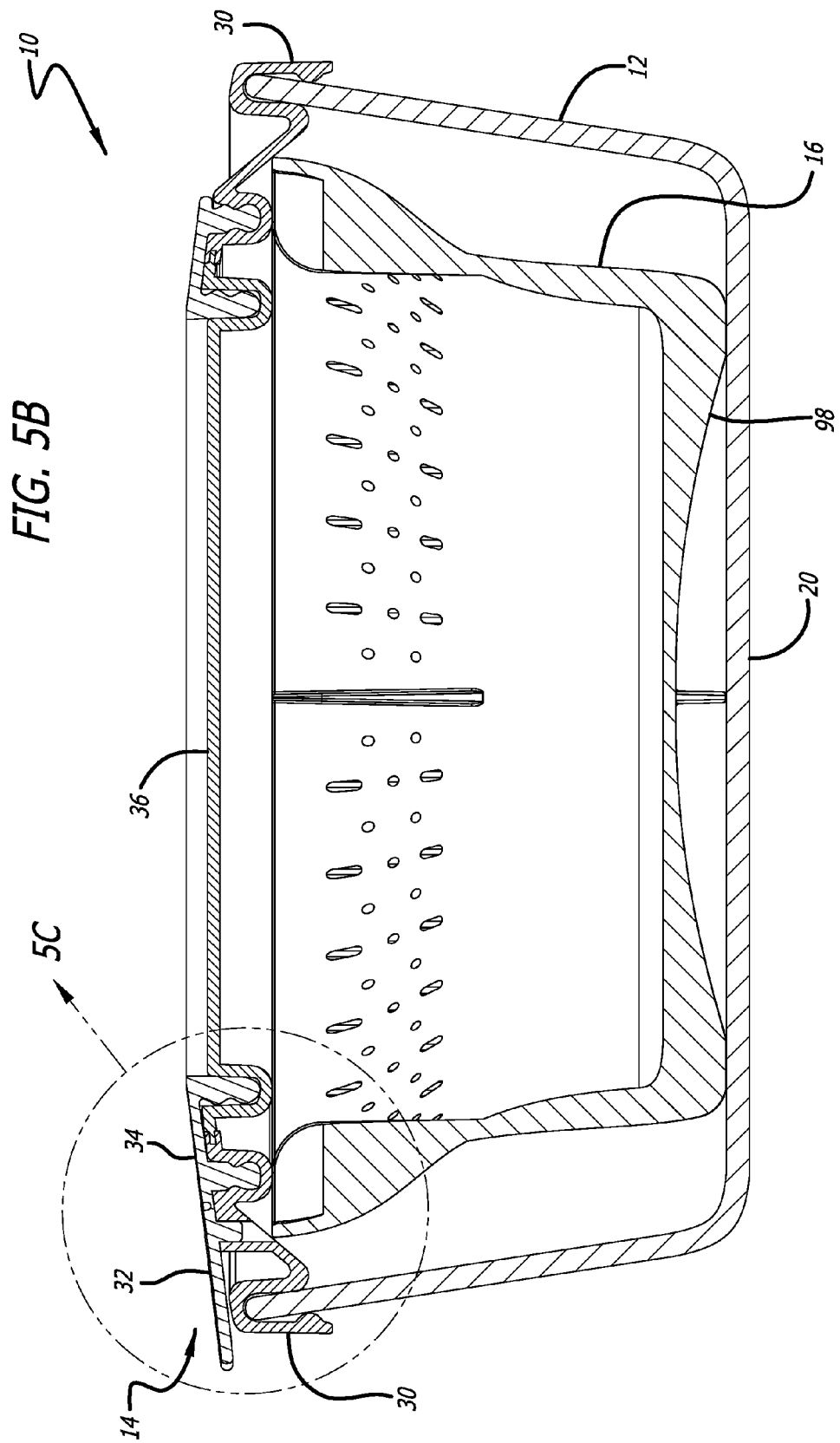

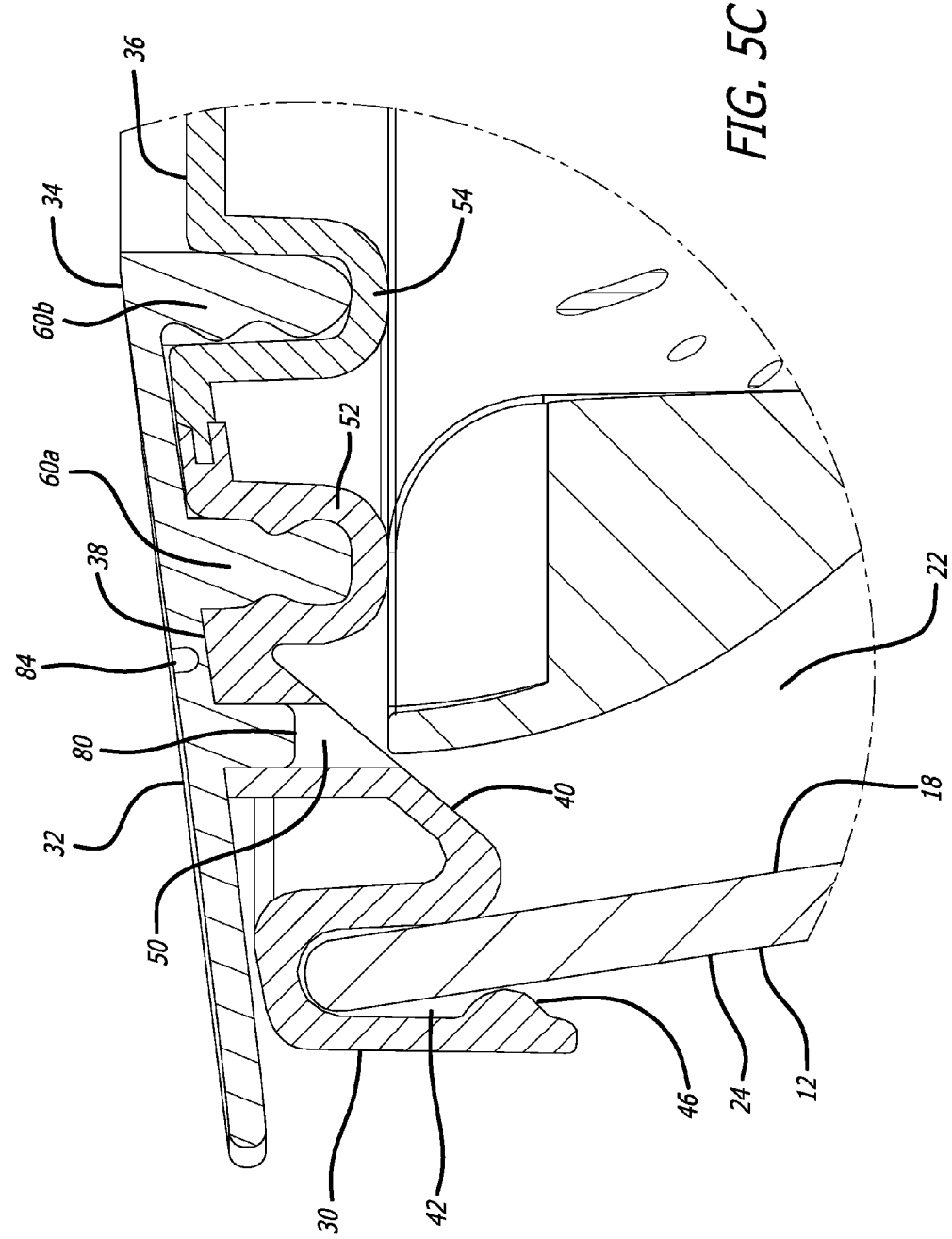

STEAMER CONTAINER SYSTEM

CROSS-REFERENCE TO RELATED APPLICATIONS

This application claims the benefit of U.S. Provisional Patent Application No. 62/129,390, filed Mar. 6, 2015, which is expressly incorporated herein by reference and made a part hereof.

FEDERALLY SPONSORED RESEARCH OR DEVELOPMENT

Not Applicable.

TECHNICAL FIELD

The present invention relates generally to cookware, and more specifically to a microwave safe steamer container system.

BACKGROUND OF THE INVENTION

Microwave safe containers, including microwave safe containers with lids, are well known in the art. Traditionally, a microwave safe container (e.g., glass, plastic) has a single-piece microwave safe lid that seals the container. While such containers and lids according to the prior art provide a number of advantages, they nevertheless have certain limitations. For example, to vent the container, a user must unsnap a portion of the lid from the cooking container, risking scalded fingers from escaping steam or burned fingers from touching the heated container. As another example, to vent the container during cooking, either the lid is placed loosely askew on the container, creating a risk that the lid will fall off when removing the container from the microwave, or the lid is skipped altogether and potentially creating a messy microwave as a result. Further, a traditional microwave container with a lid does not allow for steaming food items without the food items being in contact with the steaming liquid. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

According to one embodiment, the disclosed subject technology relates to a steamer container system for cooking foods, including cooking foods in a microwave. In one embodiment, the steamer container system comprises a container and a lid assembly.

The disclosed subject technology further relates to a container body having a sidewall member, a bottom member, and a cavity between sidewall member and the bottom member. In one embodiment, the sidewall member has a first end and a second end, and the bottom member is connected to the sidewall member adjacent the second end of the sidewall member. The cavity has an opening to the cavity adjacent the first end of the sidewall member.

The disclosed subject technology further relates to a lid assembly removably connected to the container body to close the opening to the cavity of the container body. In one embodiment, the lid assembly comprises a base member and a vent tab. In an alternate embodiment, the lid assembly comprises a base member and a vent member.

The disclosed subject technology further relates to a base member that has a top surface and a bottom surface. A container receiver is provided at the bottom surface of the base member. The container receiver engages the first end of the sidewall member of the container body.

The disclosed subject technology further relates to a first vent member receiver provided at the top surface of the base member to engage and removably retain the vent member. In an alternate embodiment, a second vent member receiver is provided at the top surface of the base member to engage and removably retain the vent member. The second vent member receiver is preferably provided inwardly of the first vent member receiver.

The disclosed subject technology further relates to a vent aperture extending from the top surface of the base member to the bottom surface of the base member to provide access to the cavity of the container body when the base member is connected to the container body.

The disclosed subject technology further relates to a vent tab connected to the base member and having a protrusion extending therefrom that is adapted to engage and selectively close the vent aperture in the base member. In one embodiment, a portion of the vent tab extends beyond a perimeter of the base member of the lid assembly when the protrusion of the vent tab is inserted into the vent aperture.

The disclosed subject technology further relates to a vent member removably engaging the base member. In one embodiment, the vent member has a body with an upper surface and a lower surface. The vent member may also have a first mating member extending from the lower surface of the body. The first mating member may engage the first vent member receiver of the base member to removably secure the vent member to the base member. In an alternate embodiment, a second mating member extends from the lower surface of the body of the vent member. The second mating member engages the second vent member receiver of the base member to removably secure the vent member to the base member.

The disclosed subject technology further relates to a vent tab extending outwardly from the body of the vent member. In this embodiment, the vent tab of the vent member has a protrusion that is adapted to engage and selectively close the vent aperture in the base member. In one embodiment the vent tab is removable from the base member.

The disclosed subject technology further relates to a living hinge that is provided at the connection of the vent tab with the body of the vent member.

The disclosed subject technology further relates to an index key on the base member and a mating index key receiver on the vent member to provide for properly aligning the vent member on the base member. The index key and index key receiver are separate from the vent aperture.

The disclosed subject technology further relates to a transparent window in the base member to allow a user to see materials in the cavity of the container body through the transparent window in the base member when the lid assembly is connected to the container body. In one embodiment, the transparent window in the base member is made of a rigid material, and the remainder of the base member is made of a flexible material. In one embodiment, the vent member is also made of a flexible material.

The disclosed subject technology further relates to a steamer basket sized to fit within the cavity of the container body. In one embodiment, the steamer basket has a bottom wall and a sidewall. In an alternate embodiment, the sidewall has a plurality of apertures therethrough and the bottom wall has no apertures therethrough. In one embodiment, a plurality of legs extend from a bottom surface of the steamer basket. The legs raise the bottom wall of the steamer basket a distance from the bottom member of the container body when the steamer basket is placed in the container body.

The disclosed subject technology further relates to a steamer container system comprising a container body having a sidewall member, a bottom member, and a cavity between the sidewall member and the bottom member, the sidewall member having a first end and a second end, the bottom member connected to the sidewall member adjacent the second end of the sidewall member, an opening to the cavity provided adjacent the first end of the sidewall member; a lid assembly removably connected to the container body to close the opening to the cavity of the container body, the lid assembly comprising a base member and a vent member; the base member having a top surface and a bottom surface, a container receiver provided at the bottom surface of the base member, the container receiver engaging the first end of the sidewall member of the container body, a first vent member receiver provided at the top surface of the base member to engage and removably retain the vent member, and a vent aperture extending from the top surface of the base member to the bottom surface of the base member to provide access to the cavity of the container body when the base member is connected to the container body; and, the vent member removably engaging the base member, the vent member having a body with an upper surface and a lower surface, a first mating member extending from the lower surface of the body, the first mating member engaging the first vent member receiver of the base member to removably secure the vent member to the base member, the vent member also having a vent tab extending outwardly from the body, the vent tab having a protrusion that is adapted to engage and selectively close the vent aperture in the base member.

The disclosed subject technology further relates to a steamer container system, comprising: a container body having a sidewall member, a bottom member, and a cavity between the sidewall member and the bottom member, the sidewall member having a first end and a second end, the bottom member connected to the sidewall member adjacent the second end of the sidewall member, an opening to the cavity provided adjacent the first end of the sidewall member; a lid assembly removably connected to the container body to close the opening to the cavity of the container body, the lid assembly comprising a base member and a vent tab, the base member having a top surface and a bottom surface, a container receiver provided at the bottom surface of the base member, the container receiver engaging the first end of the sidewall member of the container body, and a vent aperture extending from the top surface of the base member to the bottom surface of the base member to provide access to the cavity of the container body when the base member is connected to the container body, the vent tab connected to the base member and having a protrusion extending therefrom that is adapted to engage and selectively close the vent aperture in the base member, wherein a portion of the vent tab extends beyond a perimeter of the base member of the lid assembly when the protrusion of the vent tab is inserted into the vent aperture.

The disclosed subject technology further relates to a steamer container system, comprising: a container body having a sidewall member, a bottom member, and a cavity between the sidewall member and the bottom member, the sidewall member having a first end and a second end, the bottom member connected to the sidewall member adjacent the second end of the sidewall member, an opening to the cavity provided adjacent the first end of the sidewall member; a lid assembly removably connected to the container body to close the opening to the cavity of the container body, the lid assembly comprising a base member and a vent tab, the base member having a top surface and a bottom surface, a container receiver provided at the bottom surface of the base member, the container receiver engaging the first end of the sidewall member of the container body, and a vent aperture extending from the top surface of the base member to the bottom surface of the base member to provide access to the cavity of the container body when the base member is connected to the container body, the vent tab connected to the base member and having a protrusion extending therefrom that is adapted to engage and selectively close the vent aperture in the base member; and, a steamer basket sized to fit within the cavity of the container body, the steamer basket having a plurality of legs extending from a bottom surface of the steamer basket, the legs raising the bottom surface of the steamer basket a distance from the bottom member of the container body when the steamer basket is fitted in the container body.

The disclosed subject technology further relates to a steamer container system, comprising: a container body having a sidewall member, a bottom member, and a cavity between the sidewall member and the bottom member, the sidewall member having a first end and a second end, the bottom member connected to the sidewall member adjacent the second end of the sidewall member, an opening to the cavity provided adjacent the first end of the sidewall member; and, a lid assembly removably connected to the container body to close the opening to the cavity of the container body, the lid assembly comprising a base member and a vent tab, the base member having a top surface and a bottom surface, a container receiver provided at the bottom surface of the base member, the container receiver engaging the first end of the sidewall member of the container body, and a vent aperture extending from the top surface of the base member to the bottom surface of the base member to provide access to the cavity of the container body when the base member is connected to the container body, the vent tab connected to the base member and having a protrusion extending therefrom that is adapted to engage and selectively close the vent aperture in the base member, wherein the base member has a central transparent portion to allow a user to view materials in the cavity of the container body through the transparent portion in the base member when the lid assembly is connected to the container body.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 5B is a front cross-sectional view of the steamer container system of FIG. 1, taken about line 5-5 in FIG. 1.

FIG. 5C is an enlarged partial front cross-sectional view of the lid connection to the container body as shown in FIG. 5B.

DETAILED DESCRIPTION

Figure 1:
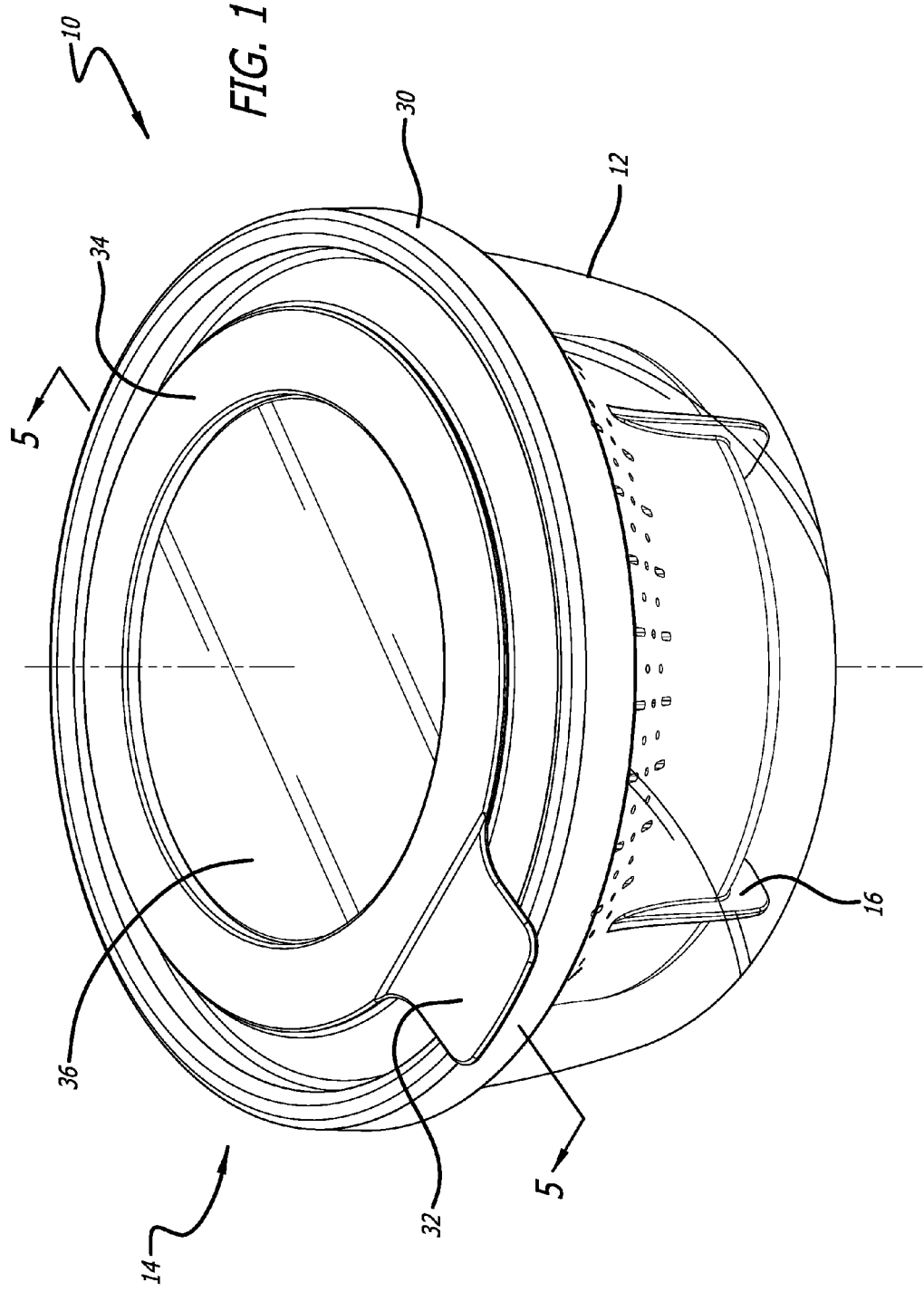
FIG. 1 is a top perspective view of an example of a steamer container system.

While the steamer container system discussed herein is susceptible of embodiments in many different forms, there is shown in the drawings, and will herein be described in detail, preferred embodiments with the understanding that the present description is to be considered as an exemplification of the principles of the steamer container system and is not intended to limit the broad aspects of the disclosure to the embodiments illustrated.

Figure 2:
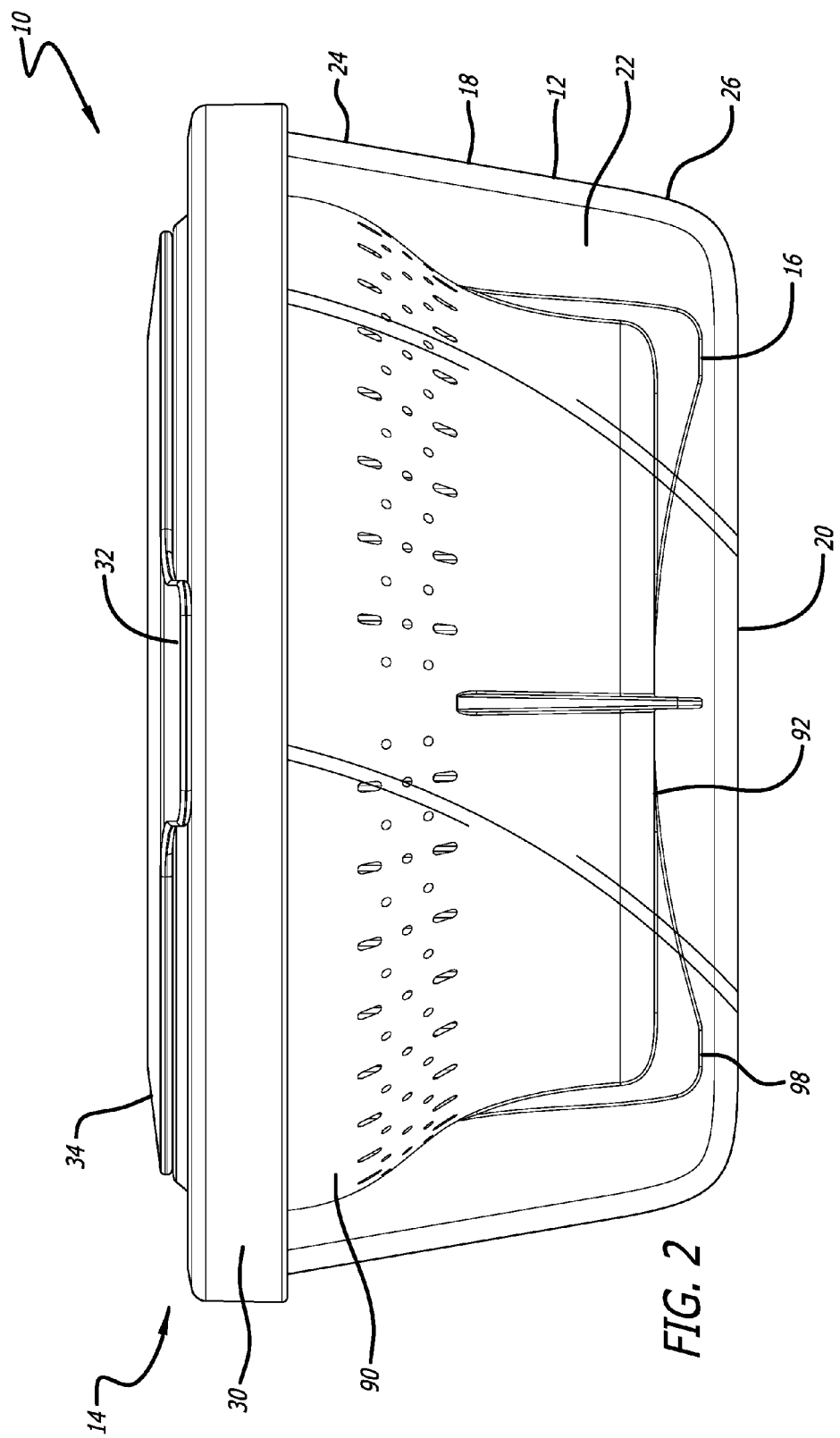
FIG. 2 is a side elevation view of the steamer container system of FIG. 1.
Figure 3:
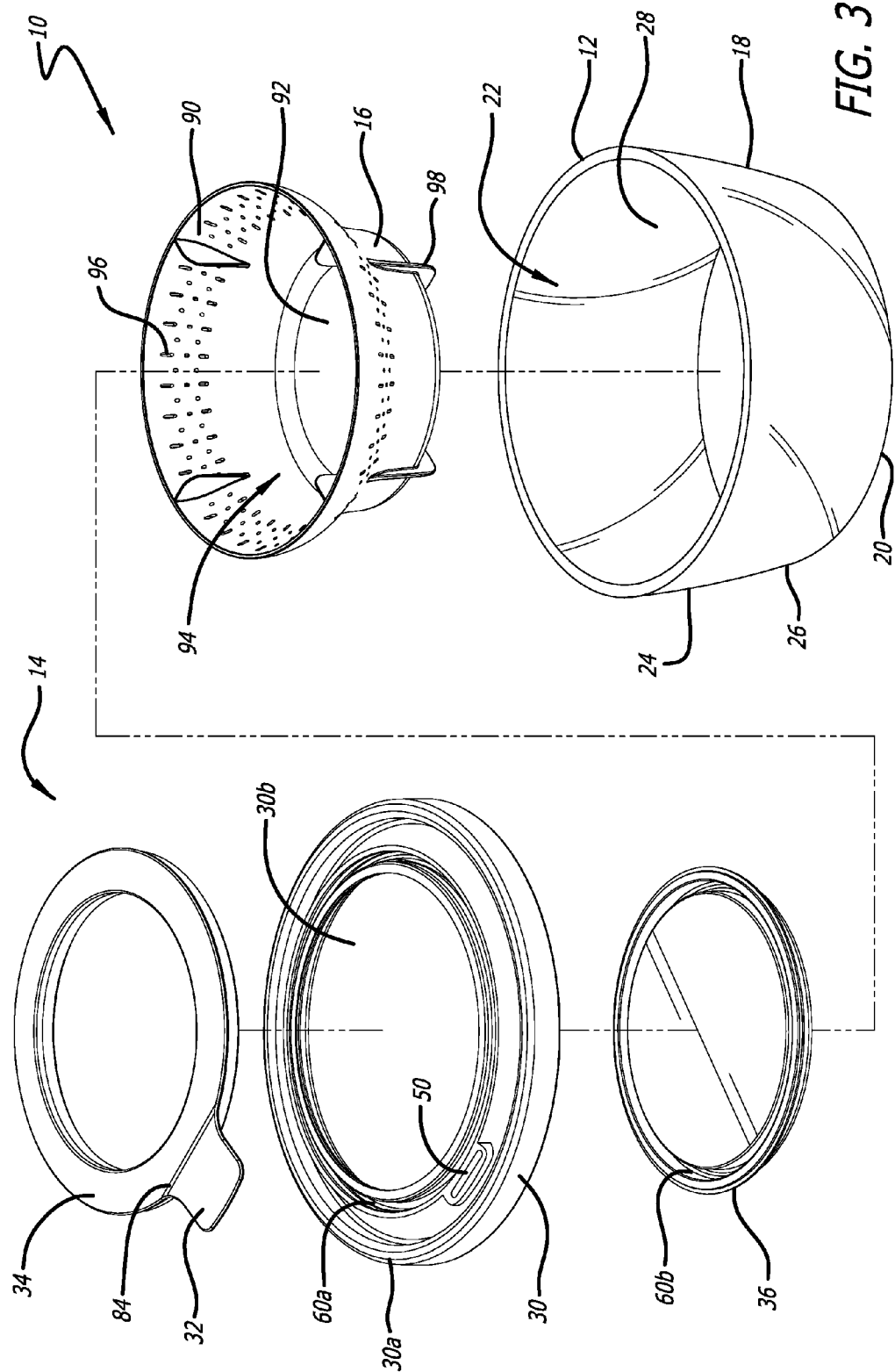
FIG. 3 is an exploded perspective view of the steamer container system of FIG. 1.

Referring now to the figures, and specifically to FIGS. 1-3, there is shown a steamer container system 10 generally comprising a container body 12 and a lid assembly 14. In alternate embodiments the steamer container system 10 may also comprise a steamer basket 16.

Figure 10:
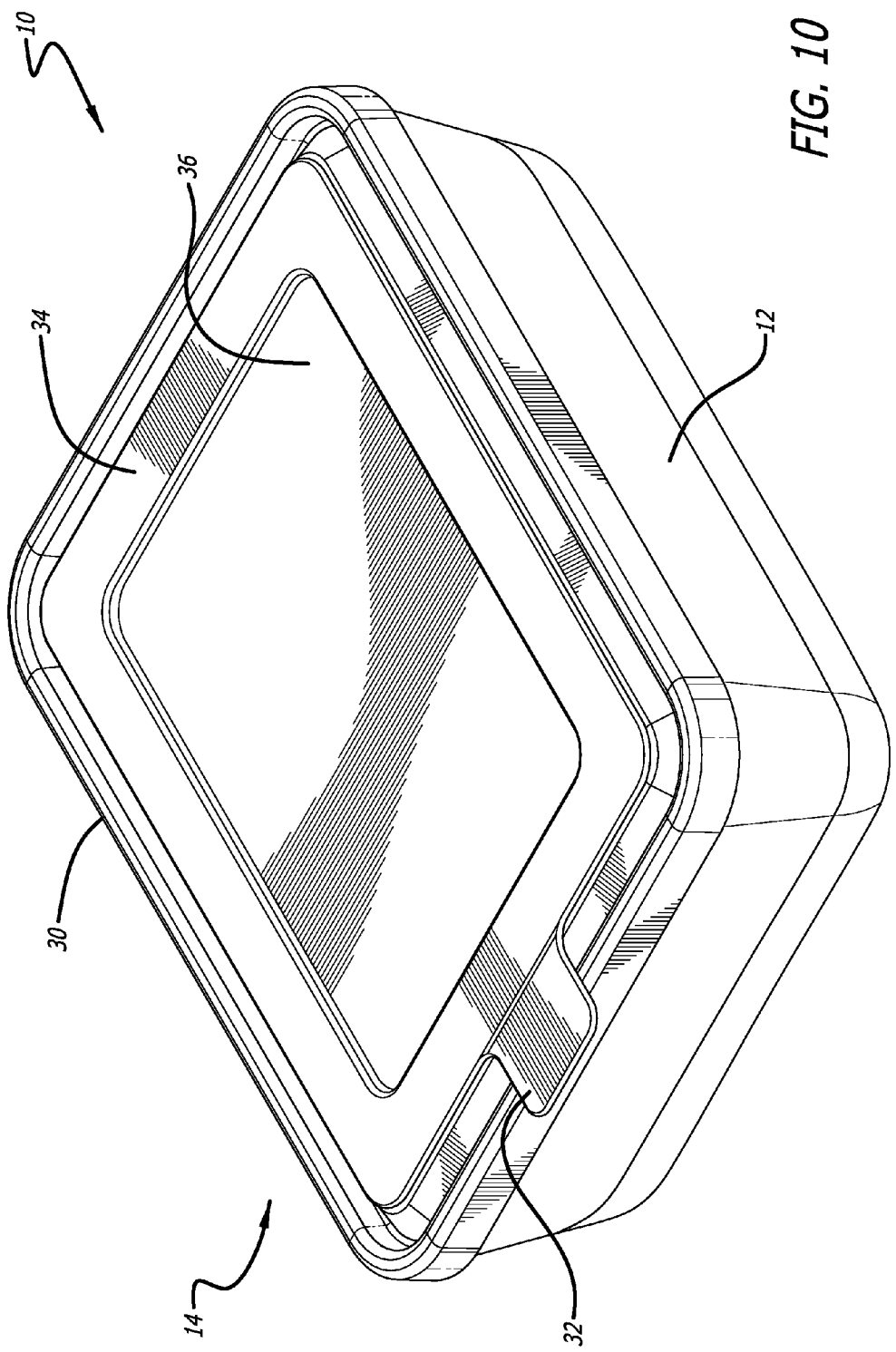
FIG. 10 is a top perspective view of another embodiment of a steamer container system.

In one embodiment the container body 12 includes a sidewall member 18, a bottom member 20, and a cavity 22 between the sidewall member 18 and the bottom member 20. The sidewall member 18 has a first end 24 and a second end 26. The bottom member 20 is connected to the sidewall member 18 adjacent the second end 26 of the sidewall member 18. The container body 12 also has an opening 28 to the cavity 22 adjacent the first end 24 of the sidewall member 18. While the shape of the container body 12 in the embodiment of FIGS. 1-6 is generally round or cylindrical, the container body 12 may alternately have a different shape, such as a square as shown in FIG. 7, a rectangle as shown in FIG. 10, a mug (not shown) or generally any other shape. Further, the sidewall member 18 may have a slope or other shape or orientation to it, as may the bottom member 20. Additionally, in a preferred embodiment the container body 12 is transparent so that a user can see the contents in the cavity 22 of the container body 12, including when cooking, even when the lid assembly 14 is positioned on the container body 12. In one embodiment the container body 12 is made of glass, including such as tempered glass, tempered soda-lime glass and borosilicate glass, although other microwave safe materials may be used, such as plastic and the like. In a preferred embodiment, the container body 12 preferably is a single integral piece.

As shown in FIGS. 1-6, the lid assembly 14 provides a closure to the cavity 22 of the container body 12. The lid assembly 14 is preferably removably connected to the container body 12 to selectively open and close the opening 28 to the cavity 22 of the container body 12. In one embodiment, the lid assembly 14 comprises a base member 30 and a vent tab 32. In an alternate embodiment the vent tab 32 may extend from a vent member 34. In a further alternate embodiment a window member 36 may be provided as part of the lid assembly 14. The exploded view of FIG. 3 displays the window member 36 separate from the base member 30, however, in alternate embodiments the window member 36 is integral with the base member 30. Additionally, in alternate embodiments the window member 36 is a transparent window member 36 to allow a user to see materials in the cavity 22 of the container body 12 through the transparent window 36 in the base member 30 when the lid assembly 14 is connected to the container body 12. In one embodiment, the transparent window 36 in the base member 30 is made of a rigid material, such as a thermoplastic polymer including polypropylene. However, the perimeter portion 30a of the base member 30 is preferably made of a flexible material, such as a polyethylene. Similarly, the vent member 34 and vent tab 32 are preferably made of a flexible material, such as a polyethylene.

Figure 5A:
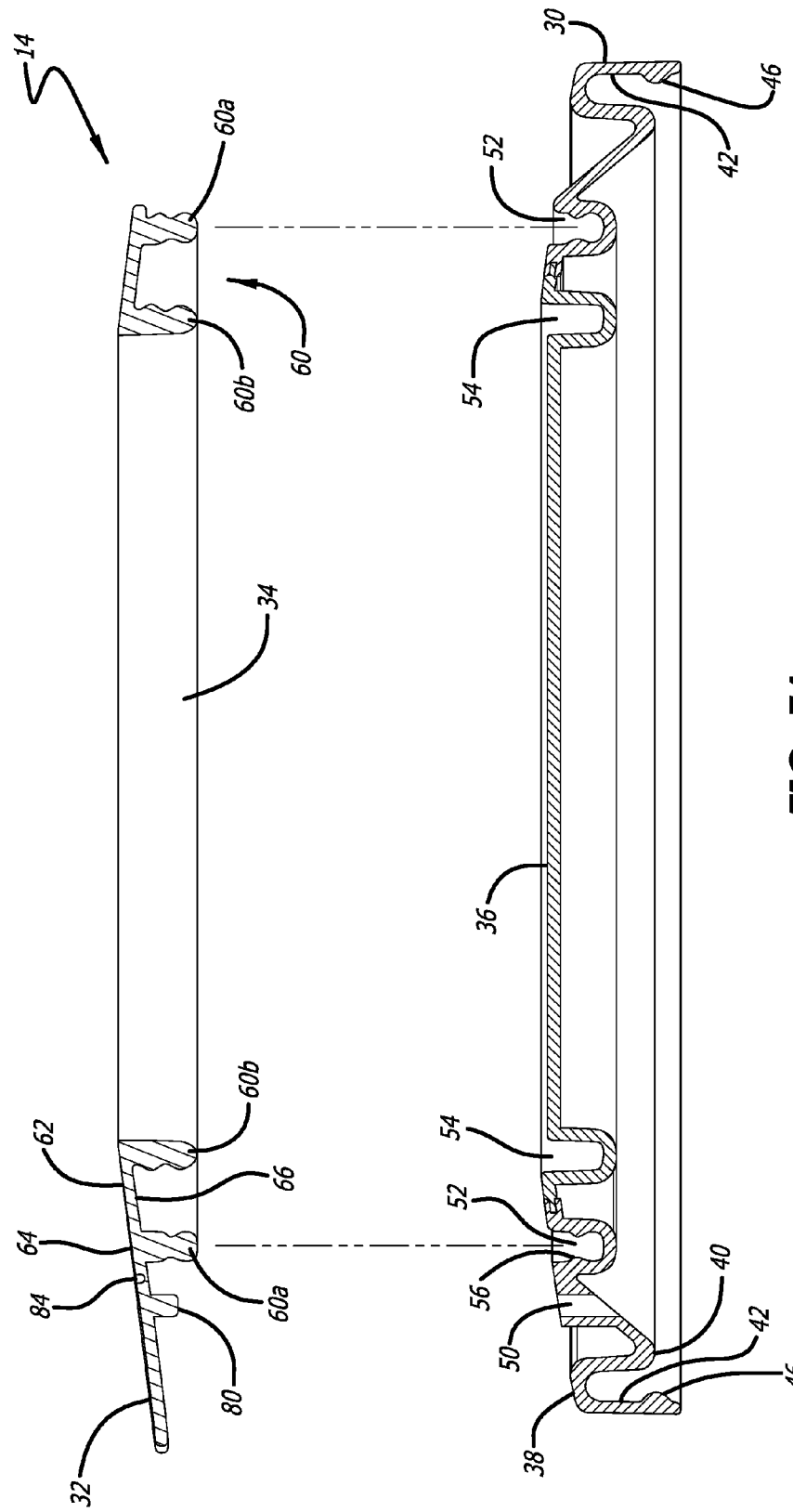
FIG. 5A is a front cross-sectional view of one embodiment of a lid for a steamer container system, taken about line 5-5 in FIG. 1.

The base member 30 of the lid assembly 14 has a top surface 38 and a bottom surface 40. The bottom surface 40 generally faces toward and may contact the container body 12, and the top surface 38 generally faces away from the container body 12 and is used to retain the vent tab 32, and in alternate embodiments, the vent member 34. In one embodiment, as shown in FIG. 3, the base member 30 comprises a perimeter member 30a that connects to the container body 12, and the base member 30 has a central opening 30b. An insert member 36, such as the window member 36 described above, may be connected to the base member 30 to close the central opening 30b. Alternately, the base member 30 may be made of a single component that comprises a complete cover for the container body 12. As a further alternate, and preferred embodiment, the base member 30 comprises both the perimeter member 30a and the insert member 36 which are joined to form the complete base member 30, as shown in FIGS. 5A-5C, and which when combined forms a complete cover for the container body 12. In one embodiment the insert member 36 and perimeter member 30a are welded together at the joint between the insert member 36 and the perimeter member 30a, such as by sonic welding, friction welding, or through some other mechanical welding. Alternately, the insert member 36 may be chemically joined to the perimeter member 30a, such as with an adhesive. In such an embodiment, the insert member 36 is not removable from the perimeter member 30a, thus forming the base member 30 having a window member 36.

As best shown in FIGS. 5A-5C, the bottom surface 40 of the base member 30 has a container receiver 42 to removably engage the first end 24 of the sidewall member 18 of the container body 12 when the lid assembly 14 is inserted on the container body 12. Referring to FIG. 5C, in one embodiment, the container receiver 42 comprises a groove 42 to receive the lip 44 at the first end 24 of the container body 12. In a preferred embodiment the groove 42 seals against the lip 44 of the container body 12, and in a most preferred embodiment a seal 46, such as a wiper seal or rib seal 46, is provided in the interior of the groove 42 to assist in sealing the base member 30 to the sidewall member 18 of the container body 12. In an embodiment as shown in FIGS. 1-6 wherein the container body 12 is circular, the groove 42 is an annular groove, however, in alternate embodiments with different shapes, such as shown in FIGS. 7 and 10, the groove 42 generally conforms to the perimeter shape of the base member 30 and container body 12, respectively.

Figure 4:
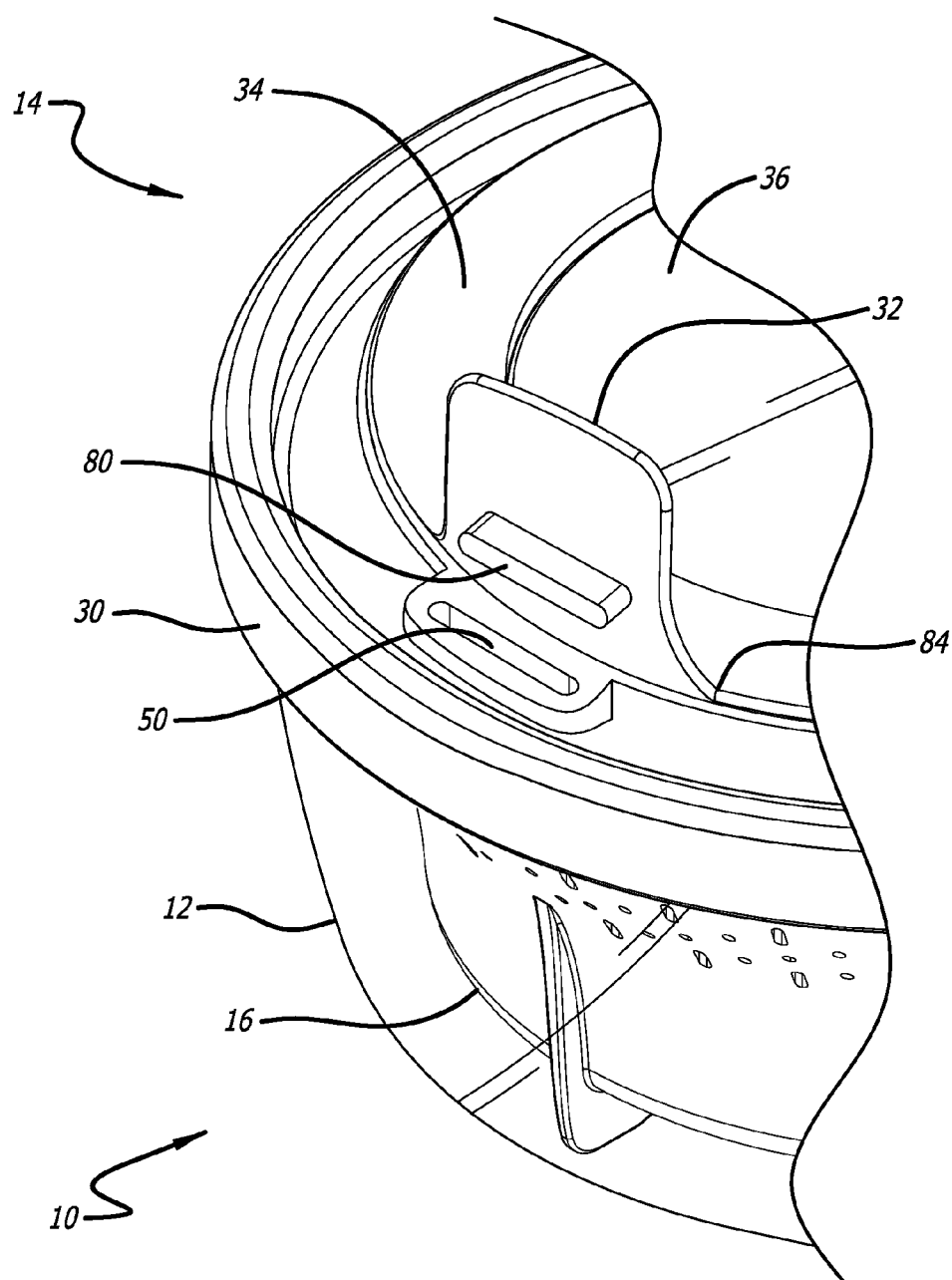
FIG. 4 is a partial perspective view of the vent opening of the steamer container system of FIG. 1.

As shown in FIGS. 3, 4 and 5C, the base member 30 of the lid assembly 14 also has a vent aperture 50. The vent aperture 50 provides access, ingress and egress, to the cavity 22 of the container body 12 even when the lid assembly 14 is connected to and on the container body 12 and covering the opening 28 to the cavity 22. The vent aperture 50 extends through the base member 30, from the top surface 38 to the bottom surface 40. In a preferred embodiment the vent aperture 50 is an elongated aperture 50, with a slot-like shape.

The base member 30 of the lid assembly 14 also preferably secures the vent tab 32 to the lid assembly 14 to allow the vent tab 32 to be used as a means to close the vent aperture 50. In one embodiment, the vent tab 32 extends from the vent member 34. In both alternate embodiments, the vent tab 32 is preferably removably connected to the base member 30, however, in further alternate embodiments the vent tab 32 need not be removable from the base member 30.

One means in which the base member 30 secures the vent tab 32 is by securing the vent member 34 with the vent tab 32 extending therefrom. As shown in FIGS. 5A-5C, the base member 30 has vent receivers to receive and secure the vent member 34 and/or vent tab 32 thereto. The vent member receivers engage and removably retain the vent member 34 and/or vent tab 32. In one embodiment, the base member 30 has a first vent member receiver 52 and a second vent member receiver 54. The first and second vent member receivers 52 and 54 are provided at the top surface 38 of the base member 30. In one embodiment, wherein the base member 30 comprises both the perimeter member 30a and the insert member 36 that are joined to form the complete base member 30, the first vent member receiver 52 is formed in the top surface 38 of the perimeter portion 40a of the base member 30, and the second vent member receiver 54 is formed in the top surface of the insert member 36 portion of the base member 30. When two vent member receivers 52, 54 are utilized, the second vent member receiver 54 is preferably located inwardly or interior of the first vent member receiver 52.

In one embodiment, the first and second vent member receivers 52 and 54 are recessed grooves 52, 54 to receive a portion of the vent member 34 and/or vent tab 32. In one embodiment, one or more of the first and second vent member receivers 52 and 54 may also have a seal 56, such as a wiper seal or rib seal 56 in the interior of the first vent member receiver 52 and/or second vent member receiver 54 to seal against the vent member 34 and/or vent tab 32.

Referring also to FIGS. 5A-5C, in one embodiment where a vent member 34 is used to secure the vent tab 32 to the base member 30 of the lid assembly 14, the vent member 34 removably engages the base member 40 through mating members 60 that are secured within the vent receivers 52 and 54. In one embodiment, the vent member 34 has a body 62 with an upper surface 64 and a lower surface 66. The mating members 60 preferably extend from the lower surface 66 of the body 62 of the vent member 34. The mating members 60 may be ribs, protrusions or some other mating member. Further, in a preferred embodiment the vent member 34 has a first mating member 60a and a second mating member 60b. The first mating member 60a engages the first vent member receiver 52, and the second mating member 60b engages the second vent member receiver 54. The mating members 60a, 60b assist in removably securing the vent member 34 and the vent tab 32 to the base member 30. In one embodiment where the vent member receivers 52, 54 are grooves, the mating members 60a, 60b are preferably protrusions that extend out from the lower surface 66 of the vent member 34. Alternately, the mating members may be grooves or female members, and the vent member receivers may be protrusions or male members. The mating members 60a, 60b may also have seals to seal against the inner wall of the mating receivers.

Figure 6:
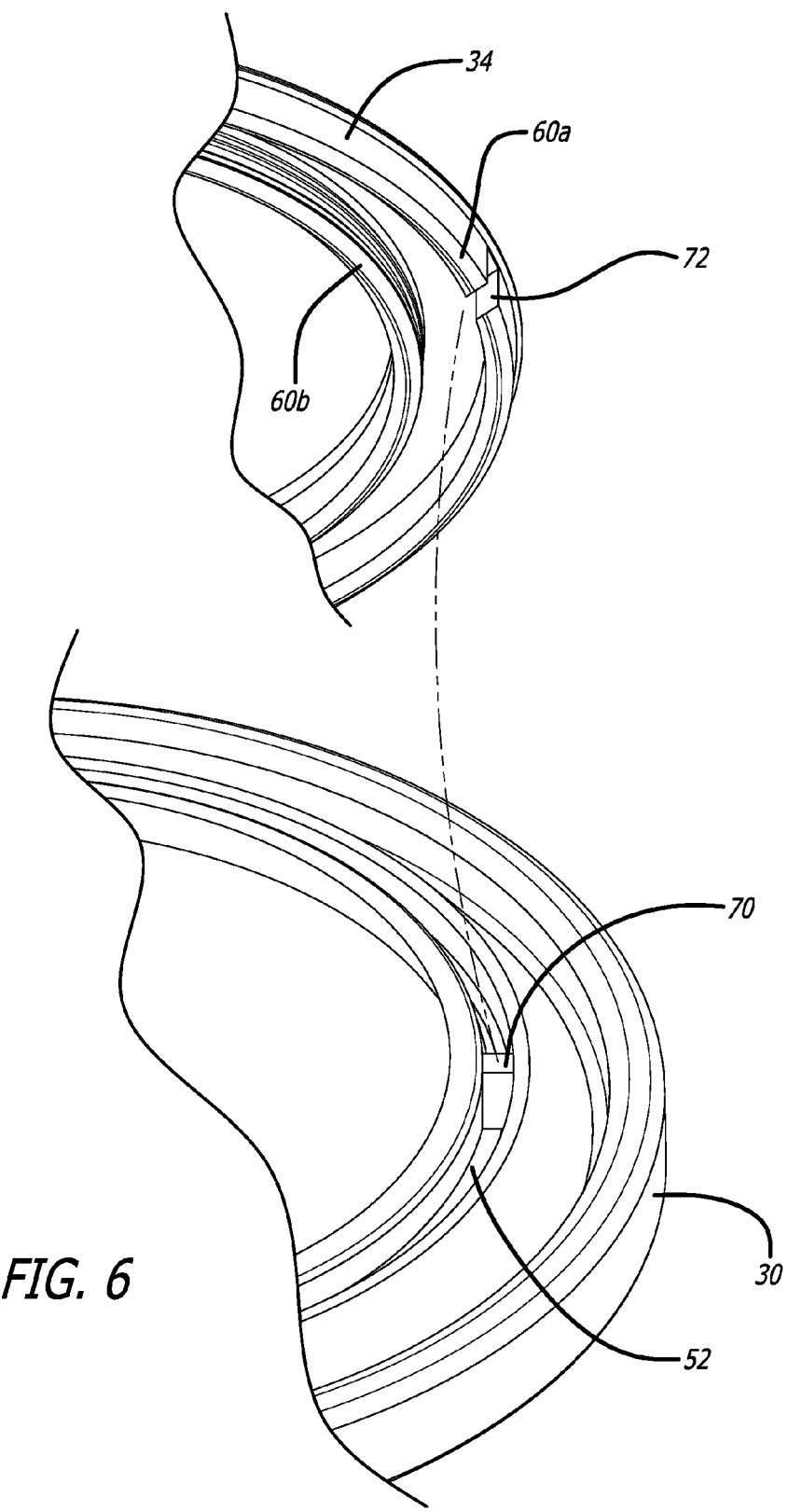
FIG. 6 is a partial exploded perspective view of a lid assembly for a steamer container system.
Figure 7:
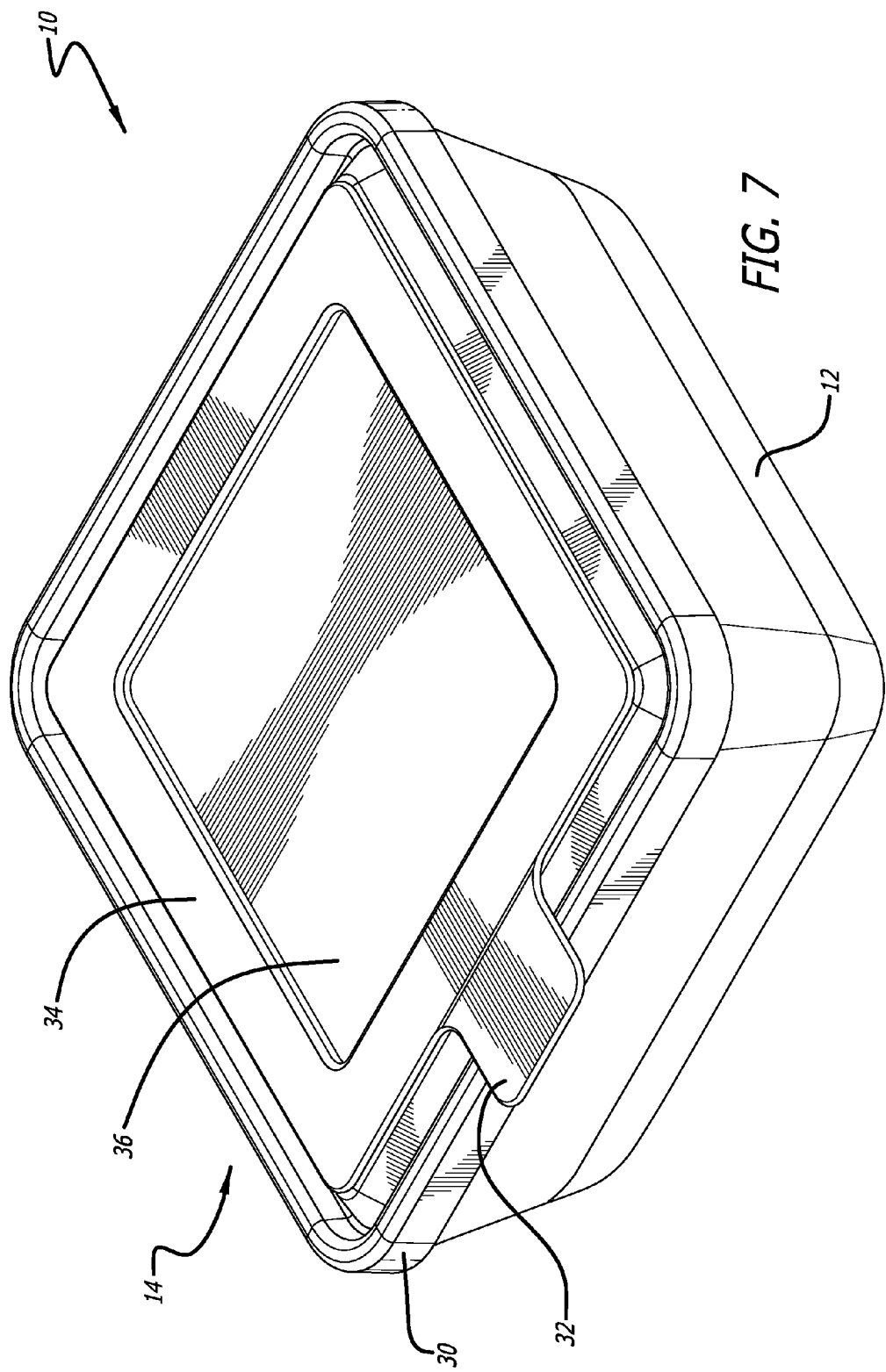
FIG. 7 is a top perspective view of another embodiment of a steamer container system.
Figure 8:
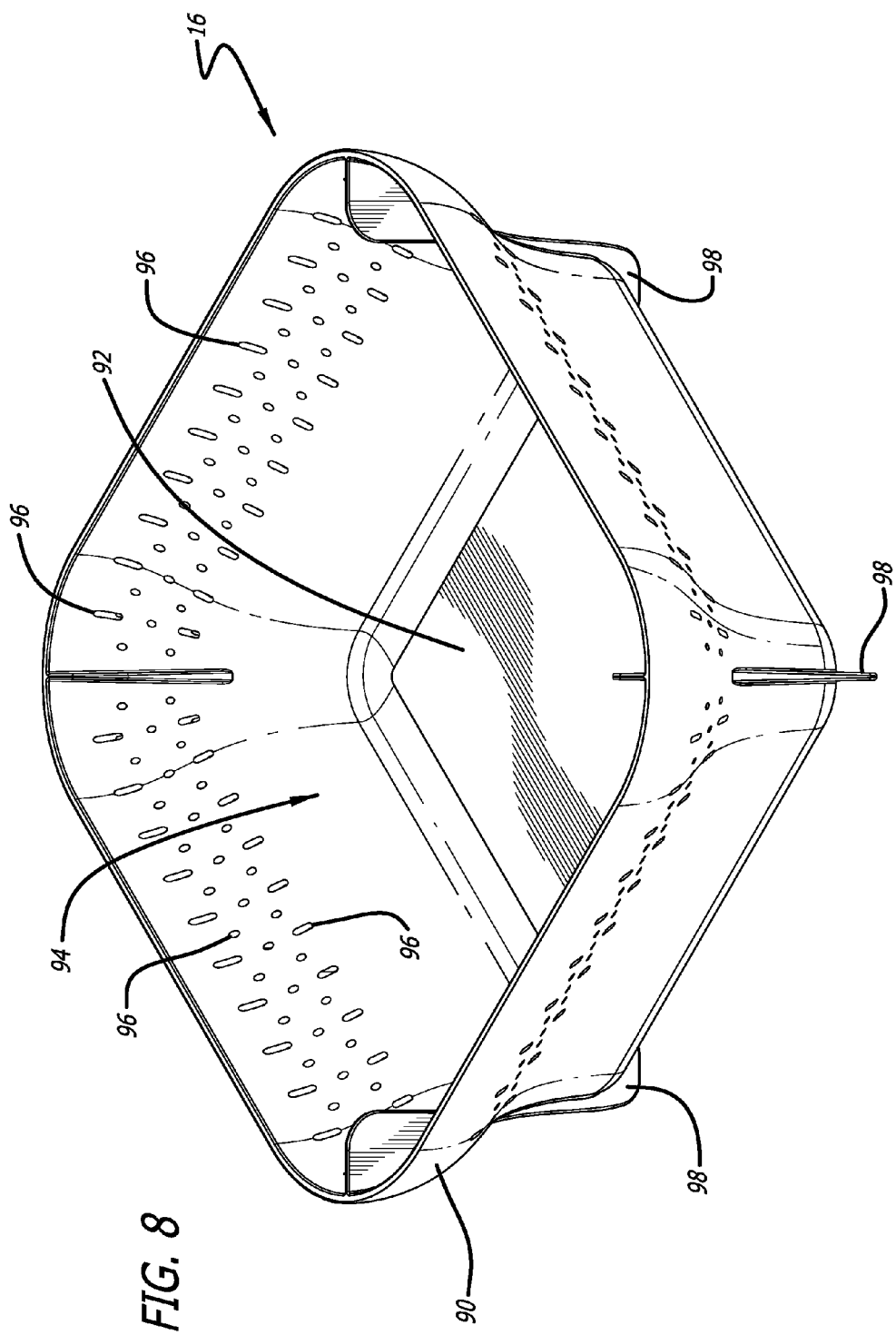
FIG. 8 is a top perspective view of one embodiment of a steamer basket for a steamer container system.
Figure 9:
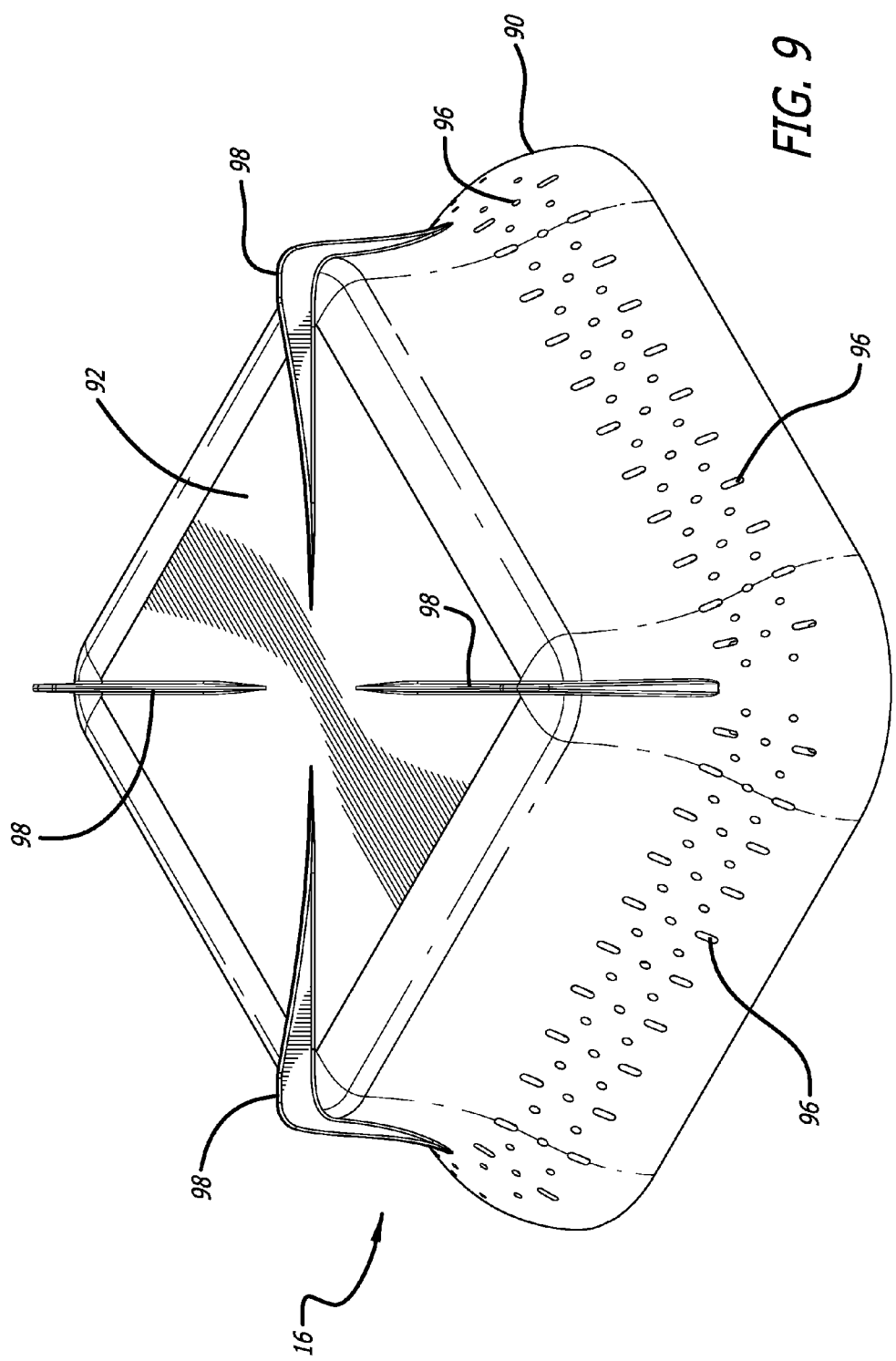
FIG. 9 is a bottom perspective view of the steamer basket of FIG. 8.

As shown in FIG. 6, in one embodiment the base member 30 has an index key 70 that is used to properly locate the vent member 34 on the base member 30. The index key 70 is preferably a solid wall member 70 located in one or both of the vent receivers 52 and 54. And, the corresponding mating member 60 or members 60a, 60b has a corresponding relief 72 that mates with the index key 70. When the index key 70 is fitted into the relief 72, the vent member 34 will be properly aligned on the base member 30.

In one embodiment, the vent member 34 is in the shape of a band or loop, which may be circular in shape as shown in FIGS. 1-6, square in shape as shown in FIG. 7, rectangular in shape as shown in FIG. 10, or any other shape to conform to the base member 30 and container body 12.

When a vent member 34 is provided, the vent tab 32 preferably extends outwardly from the body 62 of the vent member 34. The vent tab 32 has a protrusion 80 extending therefrom, preferably from the lower surface thereof, which is adapted to engage and mate with the vent aperture 50 to selectively close and seal the vent aperture 50 in the base member 30. The protrusion 80 therefore operates to both seal and allow for venting of the cavity 22 of the container 12 when the lid assembly 14 is on the container 12. The protrusion 80 of the vent tab 32 preferably operates to close and seal the vent aperture 50 when no venting is desired during or after cooking (see FIGS. 1, 2 and 5A-5C). This allows the steamer container system 10 to retain steam and/or heat. The protrusion 80 of the vent tab 32 also preferably operates to open and vent the vent aperture 50 when venting is desired during or after cooking (see FIG. 4). This allows the steamer container system 10 to vent steam and/or heat while the lid assembly 14 is on the container body 12.

As shown in FIGS. 1, 4 and 5C, to allow the vent tab 32 to be manipulated more easily, a hinge 84 is preferably provided at the connection between vent tab 32 and the body 62 of the vent member 34. In one embodiment the hinge 84 is a living hinge. Referring also to FIGS. 1, 5B, 5C, 7 and 10, in one embodiment a portion of the vent tab 32 preferably extends beyond a perimeter of the base member 30 of the lid assembly 14 when the protrusion 80 of the vent tab 32 is inserted into the vent aperture 50. This allows the vent tab 32 to be easily gripped and moved by the user.

The steamer container system 10 may also include a steamer basket 16 that is preferably sized to fit within the cavity 22 of the container body 12. As shown in FIGS. 2, 3, 5B, 8 and 9, in one embodiment the steamer basket 16 includes a sidewall 90, a bottom wall 92 toward a distal end of the sidewall member 90, and a cavity 94 therebetween. The steamer basket 16 preferably is a single integral piece formed of a microwave safe material (e.g., plastic and the like). The sidewall 90 preferably has a plurality of apertures or vent holes 96 therethrough, preferably toward the proximal end of the sidewall 90, and preferably not toward the distal end near the bottom wall 92. Additionally, in a preferred embodiment there are no apertures or vent holes in the bottom wall 92. This allows for gravies or other liquids to remain in the bottom portion of the steamer basket 16 without leaking or spilling out into the cavity 22 of the container body 12 during cooking of food in the steamer basket 16. Additionally, the steamer basket 16 may have legs 98 extending from a bottom surface of the steamer basket 16. The legs 98 operate to raise the bottom wall 92 of the steamer basket 16 a distance from the bottom member 20 of the container body 12 when the steamer basket 16 is placed in the cavity 22 of the container body 12.

For example, an amount of water may be put into the cavity 22 of the container body 12 such that the water level does not reach the lowest vent holes 96 in the steamer basket 16. Most preferably, the water level will not reach the bottom wall 92 of the steamer basket 16 because the legs 98 of the steamer basket 16 raise the bottom wall 92 from the bottom member 20 of the container body 12. Then, a food item (e.g., fresh vegetables, a frozen meal), including a marinade or gravy for the food item, may be placed in the cavity 94 of the steamer basket 16 and the contents steamed by heating the water. Accordingly, the marinade and/or gravy as well as any juices or liquids from the food items may gather on the bottom portion of the steamer basket 16 without spilling out of the steamer basket 16. When the steaming process is complete, the food item and the remaining juices may be removed from the steamer basket 16 for consumption, and any remaining water may be dumped out of the container body 12.

Alternatively to the steamer basket 16, the steamer container system 10 may include a strainer basket (not shown). The strainer basket may have multiple strainer holes disposed on the bottom portion of the strainer basket as well as in the sidewalls thereof, allowing any juices or liquids within the strainer basket to drain into the container body, as well as allowing the steam to pass through the holes in the strainer basket. For example, a block of frozen vegetables may be placed in the strainer basket and microwaved until thawed and/or warmed to a desired temperature. Any thawed liquid (e.g., frozen water) will then drain through the strainer holes so that the warmed vegetables may be removed in the strainer basket and served, while the drained liquid may be dumped out of the container body.

As shown in the figures, the steamer container system 10 may have a variety of shapes (e.g., round, square, rectangular and the like). Whatever the size and shape of the container body 12, the lid assembly 14 is sized and shaped correspondingly. Thus, the steamer container system 10 may be a sealed storage container in which food items and/or liquid items may be kept in storage (e.g., freezer, refrigerator, pantry). The steamer container system 10 may be removed from storage and heated up (e.g., microwaved) and the heated food and/or liquid item may be used or served.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. The present examples and embodiments, therefore, are to be considered in all respects as illustrative and not restrictive, and the invention is not to be limited to the details given herein. It is intended by the following claims to claim any and all applications, modifications and variations that fall within the true scope of the present teachings. Accordingly, while the specific embodiments have been illustrated and described, numerous modifications come to mind without significantly departing from the spirit of the invention and the scope of protection is only limited by the scope of the accompanying Claims.

What is claimed is:

1. A steamer container system, comprising:
  a container body having a sidewall member, a bottom member, and a cavity between the sidewall member and the bottom member, the sidewall member having a first end and a second end, the bottom member connected to the sidewall member adjacent the second end of the sidewall member, an opening to the cavity provided adjacent the first end of the sidewall member;
  a lid assembly removably connected to the container body to close the opening to the cavity of the container body, the lid assembly comprising a base member and a vent member;
  the base member having a top surface and a bottom surface, a container receiver provided at the bottom surface of the base member, the container receiver engaging the first end of the sidewall member of the container body, a first vent member receiver provided at the top surface of the base member to engage and removably retain the vent member, and a vent aperture extending from the top surface of the base member to the bottom surface of the base member to provide access to the cavity of the container body when the base member is connected to the container body; and,
  the vent member removably engaging the base member, the vent member having a body with an upper surface and a lower surface, a first mating member extending from the lower surface of the body, the first mating member engaging the first vent member receiver of the base member to removably secure the vent member to the base member, the vent member also having a vent tab extending outwardly from the body, the vent tab having a protrusion that is adapted to extend into and selectively close the vent aperture in the base member, wherein a living hinge is provided at a connection of the vent tab with the body of the vent member to allow the vent tab to pivot with respect to the body of the vent member, and wherein a portion of the vent tab extends beyond a perimeter of the base member of the lid assembly when the protrusion of the vent tab is inserted into the vent aperture.

2. The steamer container system of claim 1, further comprising a steamer basket sized to fit within the cavity of the container body, the steamer basket having a bottom wall and a sidewall, the sidewall having a plurality of apertures therethrough and the bottom wall having no apertures therethrough, a plurality of legs extending from a bottom surface of the steamer basket, the legs raising the bottom wall of the steamer basket a distance from the bottom member of the container body when the steamer basket is placed in the container body.

3. The steamer container system of claim 1, further comprising a second vent member receiver provided at the top surface of the base member to engage and removably retain the vent member, the second vent member receiver being provided inwardly of the first vent member receiver.

4. The steamer container system of claim 3, further comprising a second mating member extending from the lower surface of the body of the vent member, the second mating member engaging the second vent member receiver of the base member to removably secure the vent member to the base member.

5. The steamer container system of claim 1, further comprising a transparent window in the base member to allow a user to see materials in the cavity of the container body through the transparent window in the base member when the lid assembly is connected to the container body.

6. The steamer container system of claim 5, wherein the transparent window in the base member is made of a rigid material, wherein the remainder of the base member is made of a flexible material, and wherein the vent member is made of a flexible material.

7. The steamer container system of claim 1, further comprising, separate from the vent aperture, an index key on the base member and a mating index key receiver on the vent member to provide for properly aligning the vent member on the base member.

8. A steamer container system, comprising:
a container body having a sidewall member, a bottom member, and a cavity between the sidewall member and the bottom member, the sidewall member having a first end and a second end, the bottom member connected to the sidewall member adjacent the second end of the sidewall member, an opening to the cavity provided adjacent the first end of the sidewall member;
a lid assembly removably connected to the container body to close the opening to the cavity of the container body, the lid assembly comprising a base member and a vent tab, the base member having a top surface and a bottom surface, a container receiver provided at the bottom surface of the base member, the container receiver engaging the first end of the sidewall member of the container body, and a vent aperture extending from the top surface of the base member to the bottom surface of the base member to provide access to the cavity of the container body when the base member is connected to the container body, the vent tab connected to the base member and having a protrusion extending therefrom that is adapted to engage and selectively close the vent aperture in the base member, wherein a portion of the vent tab extends beyond a perimeter of the base member of the lid assembly when the protrusion of the vent tab is inserted into the vent aperture.

9. The steamer container system of claim 8, wherein the vent tab is connected to the lid assembly with a living hinge.

10. The steamer container system of claim 8, wherein the vent tab is removable from the base member.

11. The steamer container system of claim 8, further comprising a transparent window in the base member to allow a user to see materials in the cavity of the container body through the transparent window in the base member when the lid assembly is connected to the container body.

12. The steamer container system of claim 8, further comprising a steamer basket sized to fit within the cavity of the container body, the steamer basket having a plurality of legs extending from a bottom surface of the steamer basket, the legs raising the bottom surface of the steamer basket a distance from the bottom member of the container body when the steamer basket is fitted in the container body.

13. A steamer container system, comprising:
a container body having a sidewall member, a bottom member, and a cavity between the sidewall member and the bottom member, the sidewall member having a first end and a second end, the bottom member connected to the sidewall member adjacent the second end of the sidewall member, an opening to the cavity provided adjacent the first end of the sidewall member;
a lid assembly removably connected to the container body to close the opening to the cavity of the container body, the lid assembly comprising a base member and a vent tab, the base member having a top surface and a bottom surface, a container receiver provided at the bottom surface of the base member, the container receiver engaging the first end of the sidewall member of the container body, and a vent aperture extending from the top surface of the base member to the bottom surface of the base member to provide access to the cavity of the container body when the base member is connected to the container body, the vent tab connected to the base member and having a protrusion extending therefrom that is adapted to engage and selectively close the vent aperture in the base member; and,
a steamer basket sized to fit within the cavity of the container body, the steamer basket having a bottom wall with a bottom surface, a plurality of legs extending from the bottom surface of the steamer basket, the legs raising the bottom surface of the steamer basket a distance from the bottom member of the container body when the steamer basket is fitted in the container body, the steamer basket further having a sidewall extending from the bottom wall, the sidewall having a plurality of apertures therethrough and the bottom wall having no apertures therethrough.

14. The steamer container system of claim 13, wherein a portion of the vent tab extends beyond a perimeter of the base member of the lid assembly when the protrusion of the vent tab is inserted into the vent aperture.

15. A steamer container system, comprising:
a container body having a sidewall member, a bottom member, and a cavity between the sidewall member and the bottom member, the sidewall member having a first end and a second end, the bottom member connected to the sidewall member adjacent the second end of the sidewall member, an opening to the cavity provided adjacent the first end of the sidewall member; and,
a lid assembly removably connected to the container body to close the opening to the cavity of the container body, the lid assembly comprising a base member about a perimeter of the lid assembly, a central transparent portion interior of the base member, and a vent tab, the base member having a top surface and a bottom surface, a container receiver provided at the bottom surface of the base member, the container receiver engaging the first end of the sidewall member of the container body, and a vent aperture extending from the top surface of the base member to the bottom surface of the base member to provide access to the cavity of the container body when the base member is connected to the container body, the vent tab connected to the base member and having a protrusion extending therefrom that is adapted to engage and selectively close the vent aperture in the base member.

16. The steamer container system of claim 15, further comprising a vent member having a body with an upper surface and a lower surface, a first mating member extending from the lower surface of the body, the first mating member engaging a first vent member receiver of the base member to removably secure the vent member to the base member, the vent tab extending from the vent member.

17. The steamer container system of claim 15, wherein the central transparent portion in the base member is made of a rigid material, and wherein the remainder of the base member is made of a flexible material.

* * * * *